(12) United States Patent
Wilson et al.

(10) Patent No.: US 8,596,117 B2
(45) Date of Patent: Dec. 3, 2013

(54) ATTACHMENT PATCH FOR MOUNTING VARIOUS DEVICES

(75) Inventors: Paul B. Wilson, Tallmadge, OH (US); John D. Rensel, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 107 days.

(21) Appl. No.: 13/251,311

(22) Filed: Oct. 3, 2011

(65) Prior Publication Data

US 2013/0081457 A1   Apr. 4, 2013

(51) Int. Cl.
*G01M 17/02* (2006.01)
*B60C 23/02* (2006.01)

(52) U.S. Cl.
USPC .................................... 73/146; 152/152.1

(58) Field of Classification Search
None
See application file for complete search history.

(56) References Cited

U.S. PATENT DOCUMENTS

| | | | |
|---|---|---|---|
| 5,090,237 A | 2/1992 | Schrumpf et al. | |
| 5,500,065 A | 3/1996 | Koch et al. | |
| 5,562,787 A | 10/1996 | Koch et al. | |
| 5,573,610 A | 11/1996 | Koch et al. | |
| 5,573,611 A | 11/1996 | Koch et al. | |
| 5,731,754 A | 3/1998 | Lee, Jr. et al. | |
| 5,877,679 A | 3/1999 | Prottey | |
| 5,960,844 A | 10/1999 | Hamaya | |
| 5,971,046 A | 10/1999 | Koch et al. | |
| 6,030,478 A | 2/2000 | Koch et al. | |
| 6,105,423 A | 8/2000 | Prottey | |
| 6,192,746 B1 | 2/2001 | Wilson | |
| 6,255,940 B1 | 7/2001 | Phelan et al. | |
| 6,309,494 B1 | 10/2001 | Koch et al. | |
| 6,371,178 B1 | 4/2002 | Wilson | |
| 6,443,198 B1 | 9/2002 | Koch et al. | |
| 6,444,069 B1 | 9/2002 | Koch et al. | |
| 6,462,650 B1 | 10/2002 | Balzer et al. | |
| 6,474,380 B1 | 11/2002 | Rensel et al. | |
| 6,546,982 B1 | 4/2003 | Brown et al. | |
| 6,581,657 B1 | 6/2003 | Brown | |
| 6,624,748 B1 | 9/2003 | Phelan et al. | |
| 6,653,936 B2 | 11/2003 | Bohm et al. | |
| 6,668,884 B2 | 12/2003 | Koch et al. | |

(Continued)

FOREIGN PATENT DOCUMENTS

| | | |
|---|---|---|
| JP | 2011-02557 A | 3/2011 |
| WO | 2004068769 A | 8/2004 |
| WO | 2007048621 | 5/2007 |

OTHER PUBLICATIONS

Winter, Drew, "'Intelligent' Tires to Debut by 2013," WardsAuto.com, posted Jun. 25, 2010 9:00 A.M., Penton Media Inc.

(Continued)

*Primary Examiner* — Andre Allen

(57) ABSTRACT

A tire monitor assembly includes a rubber ply having a first side affixable to an interior surface of a tire. A pedestal extends from a second side of the rubber ply, wherein the pedestal has a top surface and at least one sidewall. The pedestal has a groove disposed in the at least one sidewall that extends along a perimeter of the pedestal, wherein the pedestal has a cavity disposed in the top surface, extending towards the rubber ply. The assembly further includes a tire monitoring device and a fastener connected to the tire monitoring device and further connected to the pedestal such that the fastener is disposed in at least one of the cavity and the groove.

20 Claims, 11 Drawing Sheets

(56) References Cited

U.S. PATENT DOCUMENTS

| | | |
|---|---|---|
| 6,724,301 B2 | 4/2004 | Ginman et al. |
| 6,788,192 B2 | 9/2004 | Shimura |
| 6,854,324 B2 | 2/2005 | Landes et al. |
| 6,860,303 B2 | 3/2005 | Rensel et al. |
| 6,868,717 B2 | 3/2005 | Koch et al. |
| 6,885,291 B1 | 4/2005 | Pollack et al. |
| 6,946,048 B2 | 9/2005 | Koch |
| 7,009,506 B2 | 3/2006 | Wilson et al. |
| 7,028,732 B1 | 4/2006 | Phelan et al. |
| 7,050,017 B2 | 5/2006 | King et al. |
| 7,082,818 B2 | 8/2006 | Wilson |
| 7,108,761 B2 | 9/2006 | Bell |
| 7,132,930 B2 | 11/2006 | Wilson et al. |
| 7,186,308 B2 | 3/2007 | Metcalf et al. |
| 7,243,534 B2 | 7/2007 | Ogawa |
| 7,275,427 B1 | 10/2007 | Martin |
| 7,292,138 B2 | 11/2007 | Jang |
| 7,295,103 B2 | 11/2007 | Muller et al. |
| 7,310,997 B2 | 12/2007 | Tozawa et al. |
| 7,325,448 B2 | 2/2008 | Ichikawa et al. |
| 7,329,325 B2 | 2/2008 | Prost |
| 7,347,088 B2 | 3/2008 | Shimura |
| 7,353,720 B2 | 4/2008 | Sinnett |
| 7,391,307 B2 | 6/2008 | Kuwajima |
| 7,430,906 B2 | 10/2008 | Nakao et al. |
| 7,444,858 B2 | 11/2008 | Bickel |
| 7,504,947 B2 | 3/2009 | Tucker |
| 7,510,618 B2 | 3/2009 | Koch |
| 7,543,490 B2 | 6/2009 | Rey et al. |
| 7,549,327 B2 | 6/2009 | Breed |
| 7,592,902 B2 | 9/2009 | Wilson et al. |
| 7,598,877 B2 | 10/2009 | Lionetti |
| 7,661,300 B2 | 2/2010 | Sinnett et al. |
| 7,690,578 B2 | 4/2010 | Kawai |
| 7,770,444 B2 | 8/2010 | Bertrand |
| 2002/0066506 A1* | 6/2002 | Wilson .................... 152/152 |
| 2002/0174925 A1 | 11/2002 | Wilson et al. |
| 2004/0094251 A1 | 5/2004 | Strache et al. |
| 2004/0182494 A1 | 9/2004 | Dominak et al. |
| 2005/0000278 A1 | 1/2005 | Haralampu et al. |
| 2005/0076982 A1 | 4/2005 | Metcalf et al. |
| 2005/0126668 A1 | 6/2005 | Fornerod et al. |
| 2006/0059982 A1* | 3/2006 | Shimura .................... 73/146 |
| 2006/0158340 A1 | 7/2006 | Wilson et al. |
| 2007/0175554 A1* | 8/2007 | Bertrand .................. 152/152.1 |
| 2007/0274030 A1 | 11/2007 | Robert |
| 2008/0053582 A1 | 3/2008 | Shimura |
| 2008/0083482 A1 | 4/2008 | Logan |
| 2008/0251172 A1 | 10/2008 | Robert et al. |
| 2009/0151828 A1 | 6/2009 | Zhao et al. |
| 2009/0151829 A1 | 6/2009 | Lionetti et al. |
| 2009/0167518 A1 | 7/2009 | Koch |
| 2010/0024538 A1 | 2/2010 | Hammerschmidt |
| 2010/0032066 A1 | 2/2010 | Nakao et al. |
| 2010/0043541 A1 | 2/2010 | Kobayakawa |
| 2010/0108211 A1 | 5/2010 | Fenkanyn |
| 2010/0122757 A1 | 5/2010 | Lionetti et al. |
| 2010/0126263 A1 | 5/2010 | Brusarosco et al. |
| 2010/0199756 A1 | 8/2010 | Hanatsuka |
| 2010/0212791 A1 | 8/2010 | Incavo et al. |
| 2010/0276048 A1* | 11/2010 | Adamson et al. ............. 152/450 |
| 2011/0025487 A1 | 2/2011 | Laird et al. |
| 2011/0162767 A1* | 7/2011 | Kleckner .................. 152/152.1 |

OTHER PUBLICATIONS

Joong Sub Han; International Search Report and Written Opinion; Feb. 25, 2013; pp. 1-11; Korean Intellectual Property Office; Daejeon, Republic of Korea.

* cited by examiner

ATTACHMENT PATCH FOR MOUNTING VARIOUS DEVICES

FIELD OF INVENTION

The present disclosure relates to the field of attaching a device to a tire. More particularly, the present disclosure relates to an apparatus attached to a tire for receiving devices with different attachment means.

BACKGROUND

Mounting devices are used to attach objects to a tire, and particularly to the innerliner of a tire. One application is to attach a radio frequency identification tag or chip (RFID) to the innerliner of a tire. Another such application is to secure a pressure and/or temperature-sensing device to the innerliner of the tire. Various fasteners are used to connect the object to the mounting device, including hook and loop fasteners, threaded connectors, clamps, pins, and snap-fit structures.

SUMMARY OF THE INVENTION

In a first embodiment, a tire monitor assembly is provided for monitoring tire information. The assembly includes a rubber ply having a first side affixable to an interior surface of a tire. A pedestal extends from a second side of the rubber ply, wherein the pedestal has a top surface and at least one sidewall. The pedestal has a groove disposed in the at least one sidewall that extends along a perimeter of the pedestal, wherein the pedestal has a cavity disposed in the top surface, extending towards the rubber ply. The assembly further includes a tire monitoring device and a fastener connected to the tire monitoring device and further connected to the pedestal such that the fastener is disposed in at least one of the cavity and the groove.

In an additional embodiment, an apparatus for mounting an object within a tire is provided. The apparatus includes a ply having a first side for mounting against an innerliner of the tire, a lower pedestal extending upwards from a second side of the ply, a neck extending upwards from the lower pedestal, and an upper pedestal extending upwards from the neck and defining a lip configured to receive a clamp. The upper pedestal has a planar top surface, with a substantially circular cavity disposed therein. The substantially circular cavity is defined by an internal sidewall extending through the upper pedestal and at least partially through the neck. The internal sidewall includes mating structure selected from the group consisting of threads and a plurality of downwardly extending slots.

In another embodiment, a tire monitoring kit includes a mounting apparatus having a plurality of mounting configurations, a tire monitoring device, and means for connecting the tire monitoring device to the mounting apparatus using only one of the plurality of mounting configurations.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

An "innerliner" refers to an impervious surface that is the innermost interior surface of the tire cavity.

Figure 1:
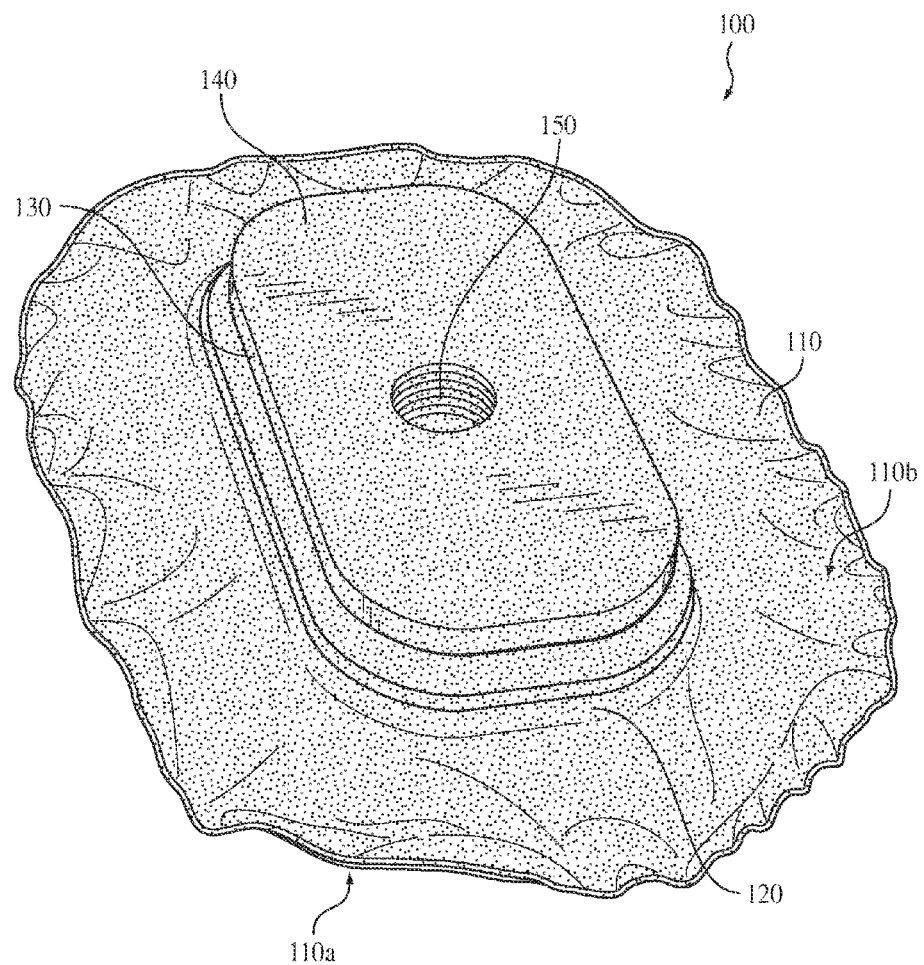
FIG. 1 is a perspective view of one embodiment of a mounting apparatus.

FIG. 1 illustrates a perspective view of one embodiment of a mounting apparatus 100. The mounting apparatus includes a ply 110 having a first side 110a and a second side 110b. The first side 110a of the ply is affixable to an innerliner of a tire (not shown). The ply 110 is constructed of a resilient material, such as rubber. In one embodiment, the ply 110 is constructed of the same rubber composition as the innerliner of the tire. It should be understood that the ply 110 may be constructed of any thermoplastic or thermoset, including without limitation, neoprene, butyl, TPU, EPDM. A mounting apparatus for tires used in severe use environments, such as high temperatures, high speeds, or high strains, may require a different rubber composition than those milder use environments, or cold weather use environments.

A lower pedestal 120 extends upwards from the second side 110b of the ply 110. A neck 130 extends upwards from the lower pedestal 120, and an upper pedestal 140 extends upwards from the neck 130. The upper pedestal 140 has a planar top surface. In an alternative embodiment (not shown), the upper pedestal may have a curved top surface.

The lower pedestal 120, neck 130, and upper pedestal 140 may also be described or characterized as a single pedestal with a plurality of sidewalls, having a groove disposed therein. In the illustrated embodiment, the groove extends along a perimeter of the pedestal. In alternative embodiments (not shown), the groove may be disposed in a single sidewall, or in any combination of sidewalls. In another alternative embodiment, multiple grooves of substantially the same shape, or multiple grooves with different shapes and dimensions may be employed. Such multiple grooves may be parallel to each other.

With continued reference to FIG. 1, the top surface of the upper pedestal 140 has a cavity 150 disposed therein. In the illustrated embodiment, the cavity 150 is substantially cylindrical. In alternative embodiments (not shown), the cavity may be cuboid, or have any geometric shape.

In one embodiment, the ply 110 is affixed to the innerliner of the tire on a sidewall portion of a tire. In another embodiment, the ply 110 is affixed to the innerliner of the tire under the belt area of the tire. In yet another embodiment, the ply 110 is affixed to the innerliner of the tire in a shoulder region of the tire. In still another embodiment, the ply 110 is affixed to the innerliner of the tire in the bead region of the tire.

The affixation position may be selected based on properties of a specific tire type. For example, a tire may be tested to determine stresses, strains, vibrations, temperatures, and other characteristics at various locations during operation of the tire. A location with minimal stresses, strains, etc. may be a desirable affixation position, because such a location will minimize the stresses put on the mounting apparatus. Alternatively, a location with maximum stresses, strains, etc. may be a desirable affixation position, because an operator may wish to monitor a tire at a location where it is most likely to fail. Other desirable affixation positions will be apparent to those skilled in the art—any position at which a tire monitoring device may transmit a signal to a receiver, without damage to the tire or the tire monitoring assembly, may be an acceptable position. The affixation location in the belt area may be a desirable location if the belt does not interfere with transmission.

In one embodiment, the ply 110 is affixed to the innerliner of a green tire at a desired location, and that portion of the mounting apparatus 100 is cured with the tire. The material of the ply 110 will bond with the rubber of the innerliner during curing. Additionally, or in the alternative, an adhesive may be used to mount the innerliner to the green tire, prior to curing.

In an alternative embodiment, the ply 110 is affixed to the innerliner of a cured tire. In one such embodiment, an uncured ply 110 is affixed to the innerliner of a cured tire using a dual cure cement or dual cure gum. Alternatively, other cements, gums, or adhesives may be used to bond the ply 110 to the innerliner. In another alternative embodiment (not shown), the mounting apparatus may be separable into a lower component and an upper component, wherein the lower component of the mounting apparatus is cured with the tire innerliner, and the upper component of the mounting apparatus is affixed to the lower component after the tire has been cured.

In an alternative embodiment (not shown), the mounting apparatus 100 does not include a ply. In such an embodiment, the lower pedestal 120 would be mounted directly to the innerliner of the tire.

Figure 2:
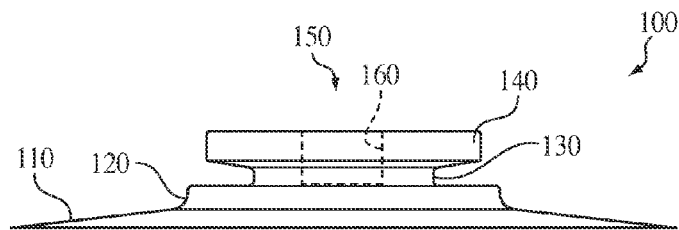
FIG. 2 is a front view of the mounting apparatus of FIG. 1.
Figure 3:
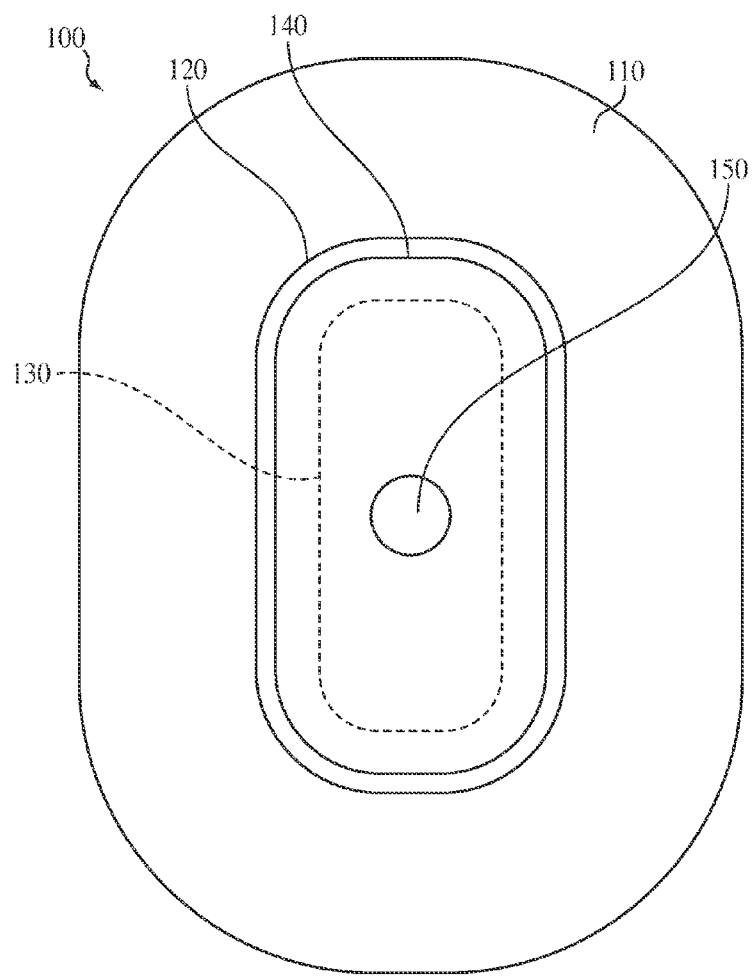
FIG. 3 is a top view of the mounting apparatus of FIG. 1.
Figure 4:
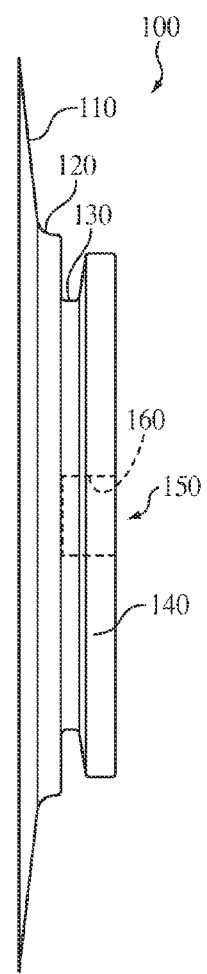
FIG. 4 is a side view of the mounting apparatus of FIG. 1.

FIGS. 2, 3, and 4 illustrate front, top, and side views, respectively, of the mounting apparatus 100. As can be seen in these views, each of the lower pedestal 120, the neck 130, and the upper pedestal 140 is substantially rectangular when viewed from the top. As shown in the top view of FIG. 3, each of the lower pedestal 120, the neck 130, and the upper pedestal 140 have rounded corners. In an alternative embodiment (not shown), one or more of the lower pedestal 120, the neck 130, and the upper pedestal 140 has straight corners. It should be understood that other geometric shapes may be employed. For example, without limitation, one or more of the lower pedestal 120, the neck 130, and the upper pedestal 140 may be circular, ovular, square, or hexagonal.

The lower pedestal 120 has a first width, a first length, and a first height. The neck 130 has a second width, a second length, and a second height. The second width, second length, and second height of the neck are less than the first width, first length, and first height of the lower pedestal, respectively. In an alternative embodiment (not shown), the second height of the neck may be greater than or equal to the first height of the lower pedestal.

The upper pedestal 140 has a third width, a third length, and a third height. The third width of the upper pedestal is greater than the second width of the neck and less than the first width of the lower pedestal. Similarly, the third length of the upper pedestal is greater than the second length of the neck and less than the first length of the lower pedestal. Additionally, the third height of the upper pedestal is greater than the first height of the lower pedestal, and greater than the second height of the neck. In an alternative embodiment (not shown), the third width of the upper pedestal may be equal to or greater than the first width of the lower pedestal. Similarly, the third length of the upper pedestal may be equal to or greater than the first length of the lower pedestal. Further, the third height of the upper pedestal may be less than or equal to the second height of the neck, or less than or equal to the first height of the lower pedestal.

In the illustrated embodiment, the neck 130 is centered on the lower pedestal 120, and the upper pedestal 140 is centered on the neck 130. This arrangement defines a lip configured to receive a clamp, and a groove that has substantially the same dimensions along the perimeter of the pedestal. In an alternative embodiment (not shown), the neck may be off-center with respect to the lower pedestal, or the upper pedestal may be off-center with respect to the neck. Such an arrangement would result in a lip and groove of varying dimensions.

With continued reference to FIGS. 2, 3, and 4, the cavity 150 is substantially centered in the upper pedestal 140. The cavity 150 is defined by an internal sidewall 160 extending through the upper pedestal 140 and at least partially through the neck 130. In an alternative embodiment (not shown) cavity 150 extends only partially through the upper pedestal. In another alternative embodiment (not shown), the cavity extends through the upper pedestal and the neck, and partially through the lower pedestal. In yet another alternative embodiment (not shown), the cavity extends completely through the mounting apparatus 100.

The internal sidewall 160 of the cavity 150 includes mating structure configured to connect with a connection element. In the embodiment of FIG. 1, the internal sidewall 160 of the cavity 150 includes internal threads.

Figure 5:
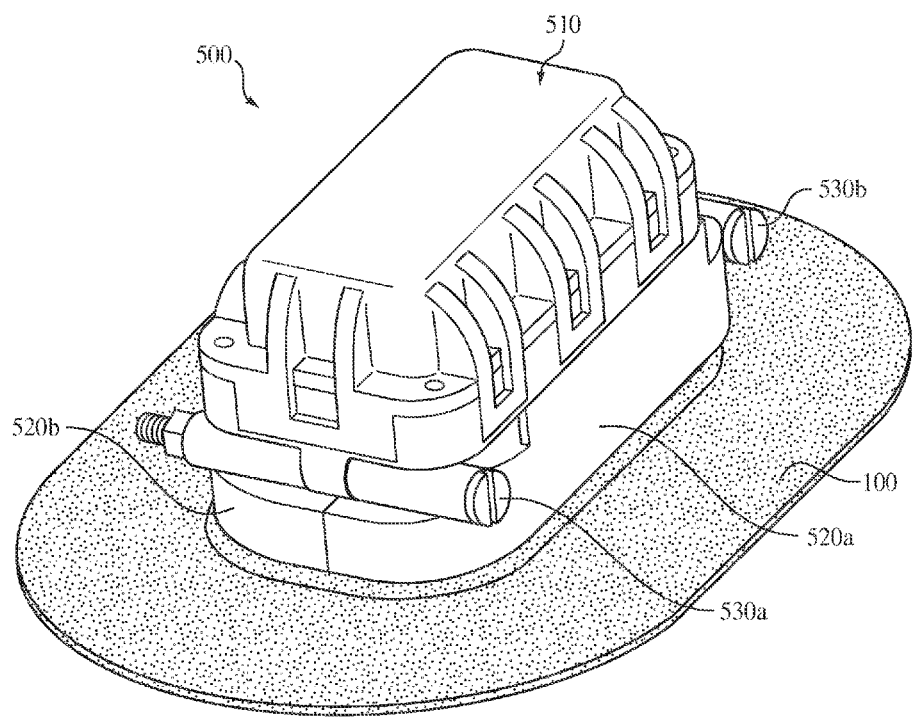
FIG. 5 is a perspective view of one embodiment of a tire monitor assembly.

FIG. 5 illustrates a perspective view of one embodiment of a tire monitor assembly 500. The tire monitor assembly includes the mounting apparatus 100 as shown in FIGS. 1-4, and described above. It should be understood that the alternative embodiments of the mounting apparatus described above may also be employed in the tire monitor assembly 500.

The tire monitor assembly 500 further includes a tire monitoring device 510. the tire monitoring device 510 is provided in a casing, and includes various sensors and communication components. In one embodiment, the tire monitoring device 510 includes a sensor for measuring an internal temperature of a tire and a transmitter device, such as a radio frequency transmitter. In an alternative embodiment, the tire monitoring device includes a sensor for measuring an internal pressure of a tire and a transmitter device. In another alternative embodiment, the tire monitoring device includes one or more sensors for measuring both an internal temperature and an internal pressure of a tire, and a transmitter device. In other alternative embodiments, the tire monitoring device may include accelerometers, stress gauges, strain gauges, sensors for counting tire revolutions, temperature sensors for measuring a temperature of tire materials, sensors for measuring tread depths, or any other known sensors.

An external communication device (not shown) may be employed to receive data transmitted from the tire monitoring device 510. The external communication device may be mounted on the vehicle, or it may be part of a handheld or stationary device. In one embodiment, the tire monitoring device 510 may be placed in a "sleep" or non-transmitting state until it receives a signal from the external communication device, or until it otherwise senses that it is in proximity with the external communication device. In such an embodiment, the tire monitoring device would include a receiver and signal processing hardware.

Additionally, the tire monitoring device 510 includes a power source, such as a battery. In an alternative embodiment, the power source may be a current generator that generates current during rotation of the tire. For example, energy may be harvested from vibration, temperature, or other environmental parameter. Alternatively, backscatter technology may be employed to derive energy from an external source. For example, energy may be derived from the external communication device described above.

The tire monitoring device 510 is mounted to the mounting apparatus 100 by first and second clamps 520a,b and first and second pins 530a,b.

Figure 6:
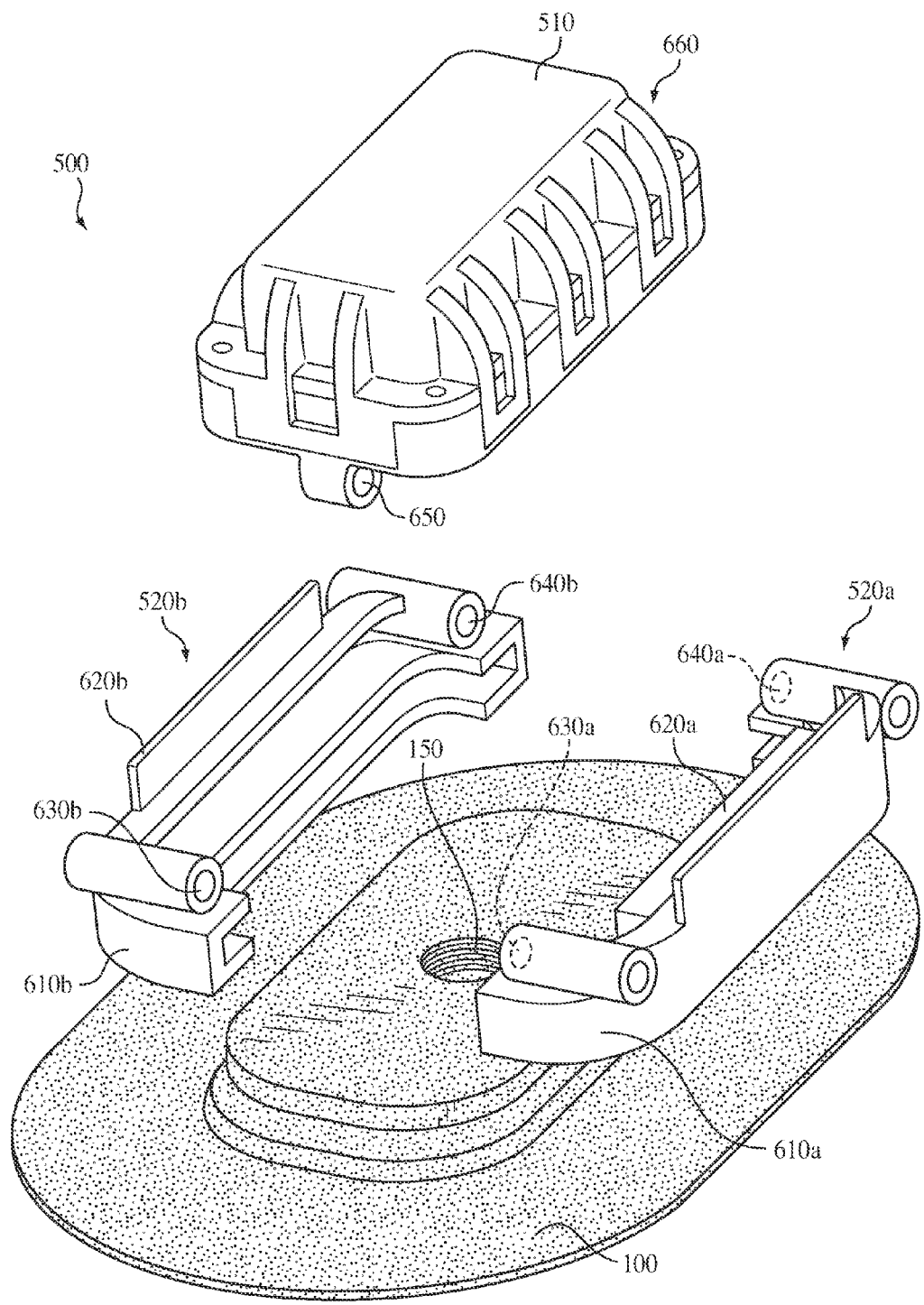
FIG. 6 is an exploded view of the tire monitor assembly of FIG. 5.

FIG. 6 illustrates an exploded view of the tire monitor assembly 500 of FIG. 5. As can be seen in this view, each of the clamps 520a,b have a lower portion 610a,b that is dimensioned to fit in the groove and receive the lip formed by the neck 130 and upper pedestal 140. The clamps 520a,b further have upper portions 620a,b that are dimensioned to fit closely around the tire monitoring device 510. In an alternative embodiment (not shown), the upper portions may fit loosely around the tire monitoring device.

Additionally, each of the clamps 520a,b has a first through hole 630a,b and a second through hole 640a,b. The tire monitoring device 510 has a first through hole 650 that corresponds to the first through holes 630a,b of the clamps 520a,b. The tire monitoring device 510 further has a second through hole (660, not shown in this view) that corresponds to the second through holes 640a,b of the clamps 520a,b. Accordingly, when the tire monitoring device 510 and the lip of the upper pedestal 140 is received by the clamps 520a,b, the first through holes 630a, 630b, and 650 are aligned to receive the first pin 530a, and the second through holes 640a, 640b, and 660 are aligned to receive the second pin 530b.

In the illustrated embodiment, each of the through holes has a smooth, cylindrical surface, and the first and second pins 530a,b have threaded ends that receive nuts. In an alternative embodiment (not shown), one or more of the through holes are threaded. In another alternative embodiment (not shown), a locking pin or other fastener may be used in place of a nut. In yet another alternative embodiment, a band clamp may be used to secure the tire monitoring device.

In this embodiment, the cavity 150 is not used to mount the tire monitoring device 510 to the mounting apparatus 100. Accordingly, the cavity 150 will provide a void beneath the tire monitoring device 510. In an alternative embodiment (not shown), a plug may be placed in the cavity. The plug may have structures corresponding to the sidewall of the cavity. For example, the plug and the cavity may both be threaded.

Figure 7A:
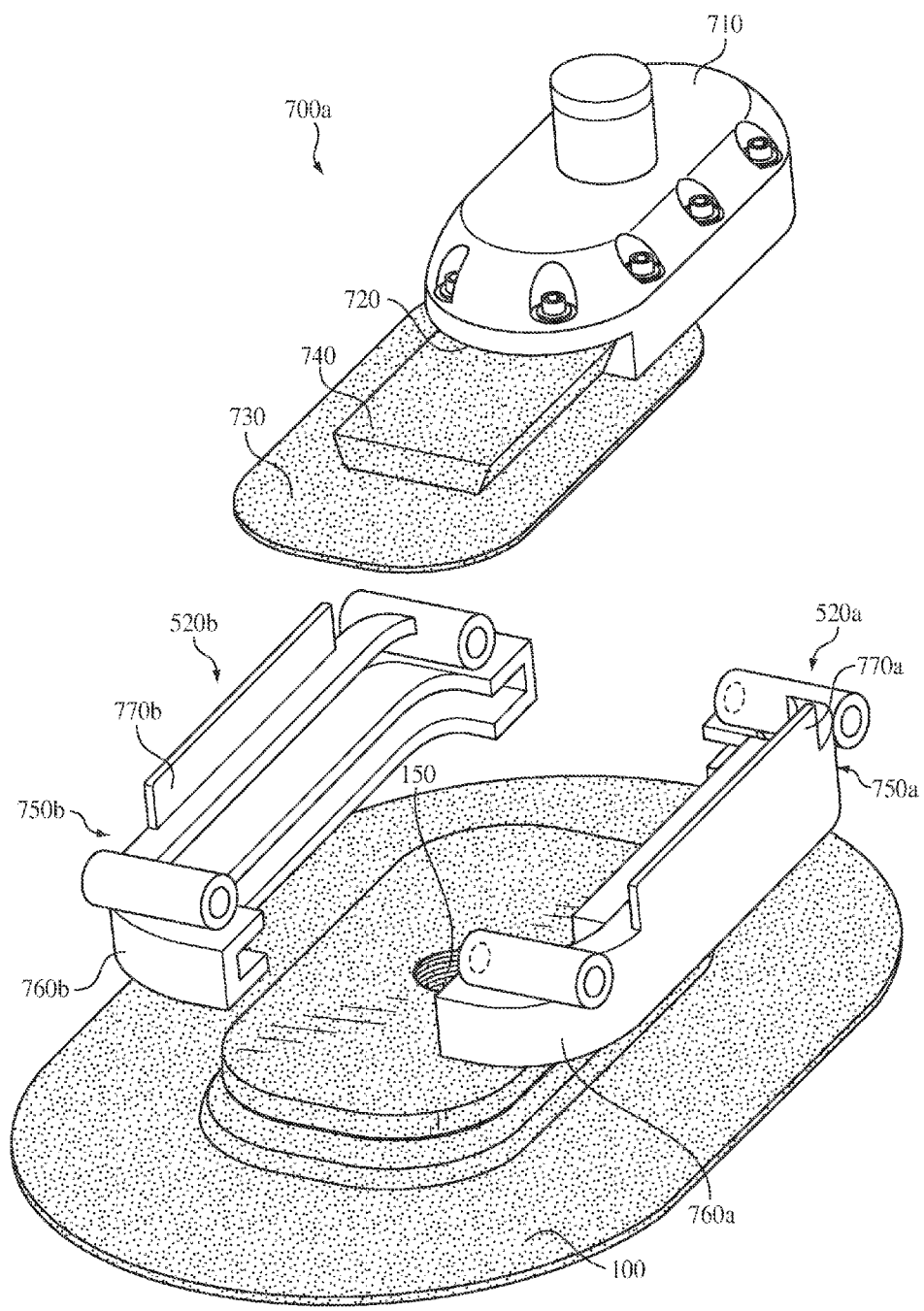
FIG. 7 is an exploded view of an alternative embodiment of a tire monitor assembly.

FIG. 7A illustrates an exploded view of an alternative embodiment of a tire monitor assembly 700a. The tire monitor assembly 700a is substantially the same as the tire monitor assembly 500, except for the differences described herein. Like reference numerals are used for like components. It should be understood that the alternative embodiments discussed in relation to the tire monitor assembly 500 may also apply to the tire monitor assembly 700a.

In the illustrated embodiment, a tire monitoring device 710 includes a groove 720. The tire monitor assembly 700a further includes an intermediate member 730 that has a rib 740 that is slidably received by the groove 720 of the tire monitoring device 710.

The tire monitor assembly 700a further includes clamps 750a,b that are configured to secure the tire monitoring device 710 and the intermediate member 730 to the apparatus 100. Each of the clamps 750a,b has a lower portion 760a,b that is substantially the same as the lower portion 610a,b of the clamps 510a,b, and is dimensioned to fit in the groove and receive the lip formed by the neck 130 and upper pedestal 140. Each of the clamps 750a,b further has an upper portion 770a,b that is dimensioned to receive the intermediate member 730. The tire monitoring device 710 would slidably attach to the mated intermediate member 730, and could be retained by a retaining pin (not shown) inserted through the ends of the tire monitoring device 710.

Figure 7B:
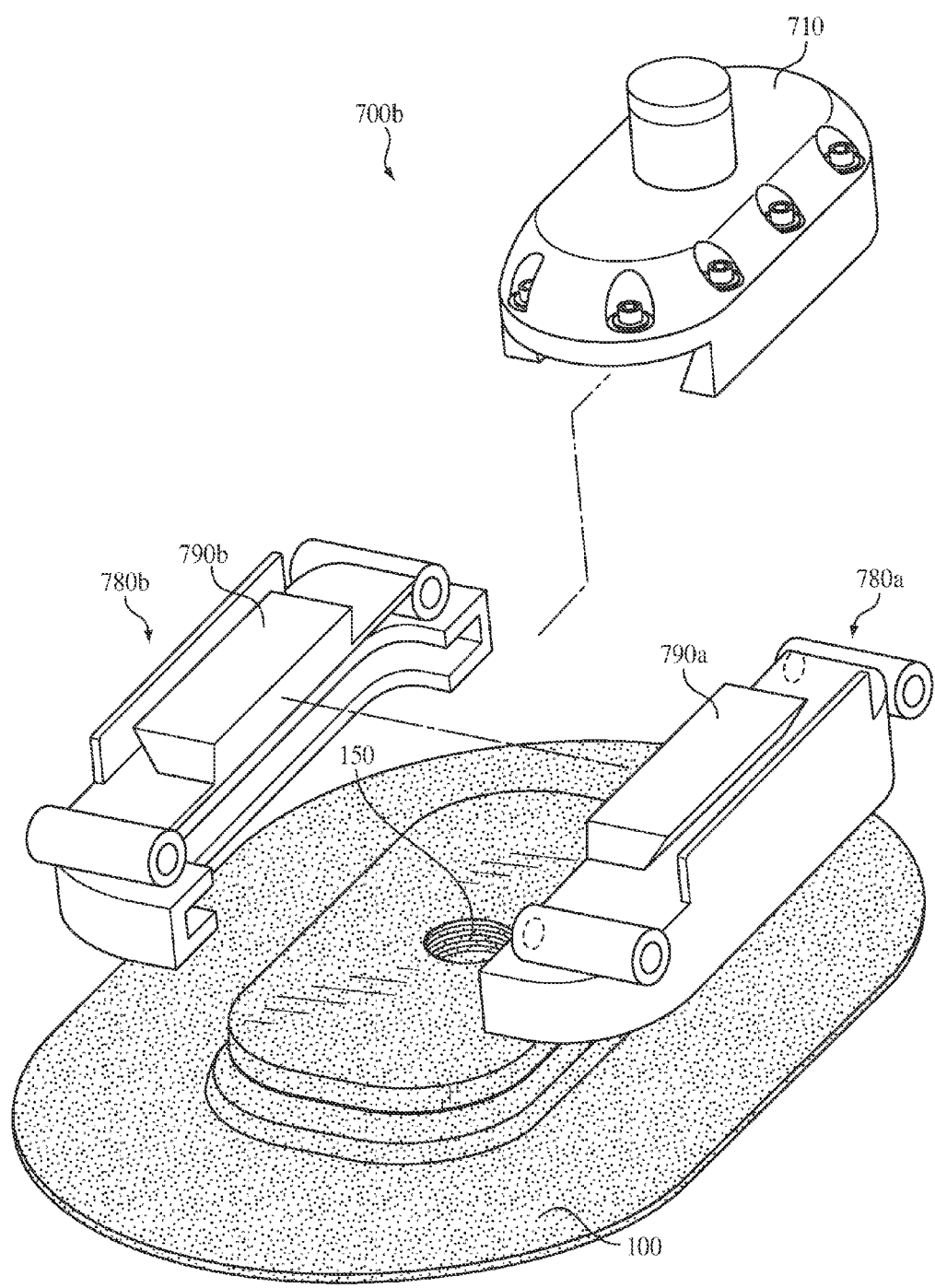

FIG. 7B illustrates an exploded view of an alternative embodiment of a tire monitor assembly 700b. The tire monitor assembly 700b is substantially the same as the tire monitor assembly 700a, except for the differences described herein. Like reference numerals are used for like components. It should be understood that the alternative embodiments discussed in relation to the tire monitor assembly 700a may also apply to the tire monitor assembly 700b.

In the illustrated embodiment, the tire monitoring device 710 does not slide onto an intermediate member. Instead, each of the clamps 780a,b further has an upper portion 790a,b having a profile that matches the groove 720 of the tire monitoring device 710. These upper portions 790a,b would join together when the clamps 780a,b are mated such that the profile matches the dimensions of the rib 740 shown in FIG. 7A. The tire monitoring device 710 would slidably attach to the joined clamps 780a,b, and could be retained by a retaining pin (not shown) inserted through the ends of the tire monitoring device 710. The presence of the tire monitoring device 710 may keep the two halves of the clamp 780a,b joined and clamped to the mounting apparatus 100, thereby eliminating the need for retaining pins in this embodiment.

Figure 8A:
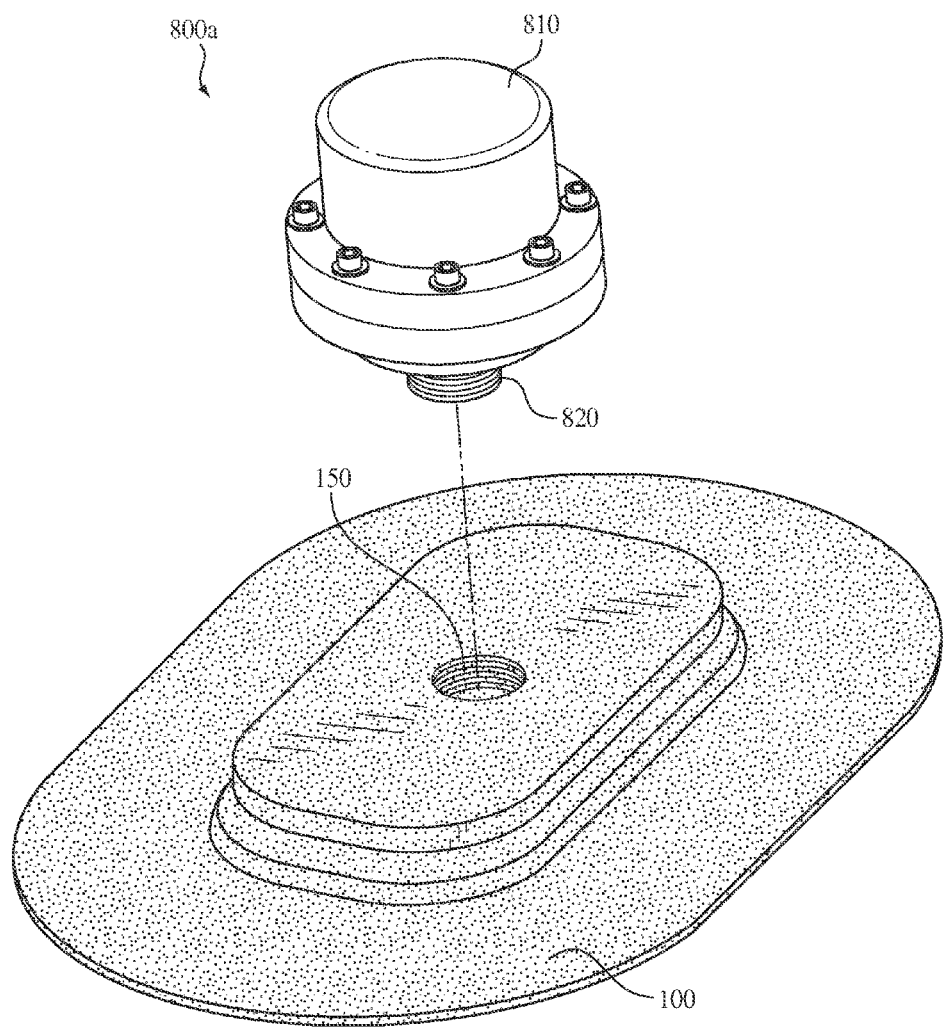
FIG. 8 is an exploded view of another alternative embodiment of a tire monitor assembly.

FIG. 8A illustrates an exploded view of another alternative embodiment of a tire monitor assembly 800a. The tire monitor assembly 800a is substantially the same as the tire monitor assembly 500, except for the differences described herein. Like reference numerals are used for like components. It should be understood that the alternative embodiments discussed in relation to the tire monitor assembly 500 may also apply to the tire monitor assembly 800a.

In the illustrated embodiment, a tire monitoring device 810 includes a threaded fastener 820. In this embodiment, the cavity 150 in the mounting apparatus 100 has internal threads that correspond to the threaded fastener 820. Accordingly, the tire monitoring device 810 may be mounted to the mounting apparatus 100 by aligning the threaded fastener 820 with the cavity 150 and rotating the tire monitoring device 810 and the threaded fastener 820 until the tire monitoring device 810 is secure.

In one embodiment, the tire monitoring device 810 is mounted solely by the threaded fastener 820 and the cavity 150. In an alternative embodiment (not shown), the tire monitoring device 810 is further secured by clamps, in the manner discussed above with respect to the tire monitor assembly 500. The clamps may be the clamps 520a,b or modified clamps. The clamps may directly engage the tire monitoring device 810, or one or more intermediate members (not shown) may be positioned between the clamps and tire monitoring device to further secure the tire monitoring device.

Figure 8B:
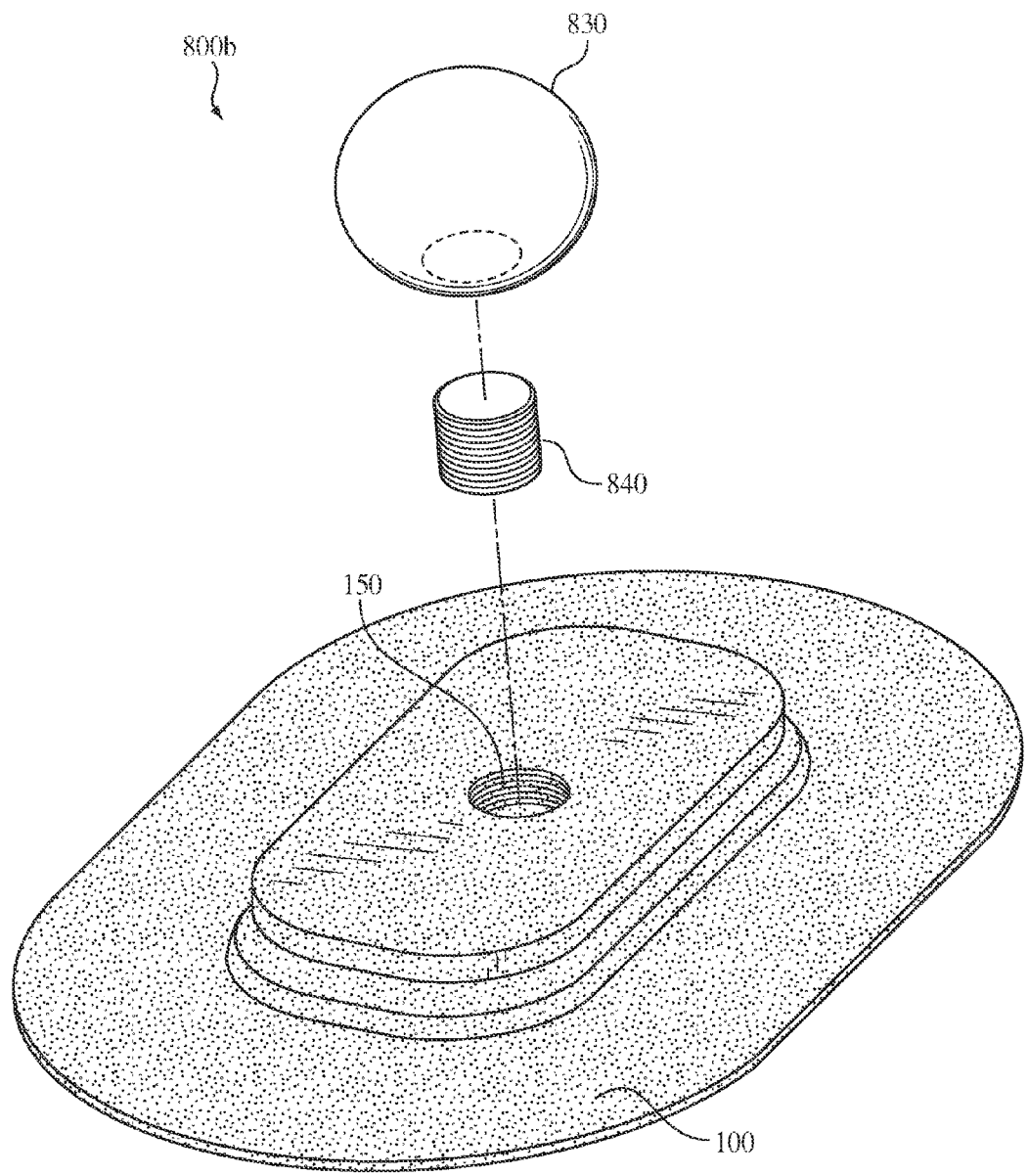

FIG. 8B illustrates an exploded view of another alternative embodiment of a tire monitor assembly 800b. The tire monitor assembly 800b is substantially the same as the tire monitor assembly 800a, except for the differences described herein. Like reference numerals are used for like components. It should be understood that the alternative embodiments discussed in relation to the tire monitor assembly 800a may also apply to the tire monitor assembly 800b.

In the illustrated embodiment, a tire monitoring device 830 includes a threaded aperture (not shown) configured to receive a threaded fastener 840. In this embodiment, the cavity 150 in the mounting apparatus 100 has internal threads that correspond to the threaded fastener 840. Accordingly, the tire monitoring device 830 may be mounted to the mounting apparatus 100 by aligning the threaded fastener 840 with the cavity 150 of the mounting apparatus 100 and rotating the threaded fastener 840 until it is secure. The threaded aperture of the tire monitoring device 830 may then be aligned, and rotated onto the threaded fastener 840. Alternative, the threaded fastener 840 may first be connected to the tire monitoring device 830 and then to the mounting apparatus 100.

In the illustrated embodiment, the tire monitoring device 830 is mounted solely by the threaded fastener 840 and the cavity 150. In an alternative embodiment (not shown), the tire monitoring device 830 is further secured by clamps, in the manner discussed above with respect to the tire monitor assembly 500. The clamps may be the clamps 520a,b or modified clamps. The clamps may directly engage the tire monitoring device 830, or one or more intermediate members (not shown) may be positioned between the clamps and tire monitoring device to further secure the tire monitoring device.

Figure 9:
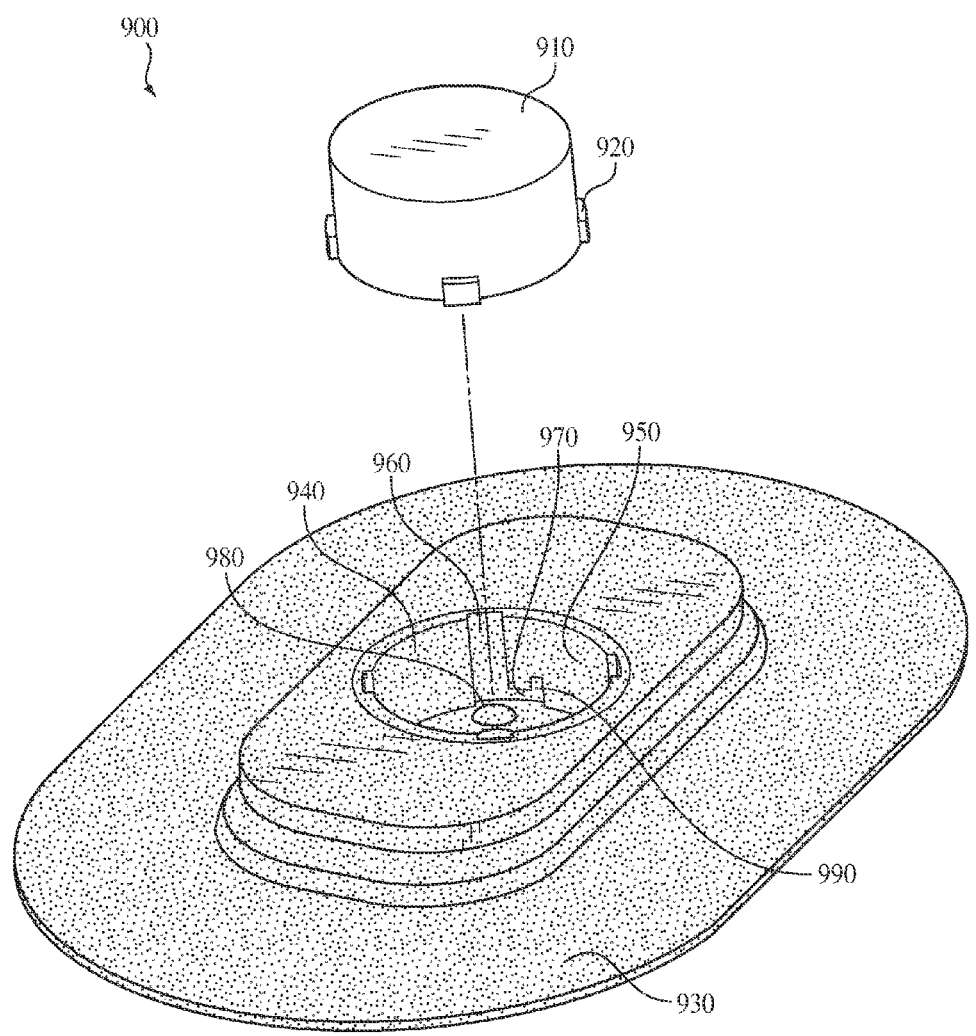
FIG. 9 is an exploded view of still another alternative embodiment of a tire monitor assembly

FIG. 9 illustrates an exploded view of still another alternative embodiment of a tire monitor assembly 900. The tire monitor assembly 900 is substantially the same as the tire monitor assembly 800, except for the differences described herein. Like reference numerals are used for like components. It should be understood that the alternative embodiments discussed in relation to the tire monitor assembly 800 may also apply to the tire monitor assembly 900.

In the illustrated embodiment, a tire monitoring device 910 includes a plurality of tabs 920. The tabs may also be referred to as "bayonets." The tire monitoring device 910 is mounted to a mounting apparatus 930 that is substantially the same as the mounting apparatus 100, except for the differences described herein.

The mounting apparatus 930 includes a cavity 940 that has sidewall 950 with a plurality of substantially vertical grooves 960 disposed therein. The plurality of substantially vertical grooves 960 are configured to receive the tabs 920 of the tire monitoring device 910. At the base of the sidewall 950, horizontal grooves 970 extend substantially orthogonally from the substantially vertical grooves 960. A biasing member 980 is disposed in the bottom of the cavity. Exemplary biasing members include rubber members and springs. It should be understood that any thermoplastic or thermoset material may be employed.

To mount the tire monitoring device 910 to the mounting apparatus 930, the tabs 920 of the tire monitoring device 910 are aligned with the substantially vertical grooves 960 of the cavity 940. The tire monitoring device 910 is then pushed downwards until it reaches the bottom surface of the cavity. The tire monitoring device 910 is then rotated such that the tabs 920 are disposed in the horizontal grooves 970. The biasing member 980 biases the tire monitoring device 910 upwards, such that the tabs 920 are biased into locking notches 990 that extend upwards from the ends of the horizontal grooves 970. In an alternative embodiment (not shown), the cavity does not include locking notches, and the tabs are biased such that they abut the walls of the horizontal grooves 970. In either manner, the tire monitoring device 910 may be prevented from rotating within the cavity 150.

In one embodiment, the tire monitoring device 910 is mounted solely by the horizontal grooves 970 in the cavity 940. In an alternative embodiment (not shown), the tire monitoring device 910 is further secured by clamps, in the manner discussed above with respect to the tire monitor assembly 500. The clamps may be the clamps 520a,b or modified clamps. The clamps may directly engage the tire monitoring device 910, or one or more intermediate members (not shown) may be positioned between the clamps and tire monitoring device to further secure the tire monitoring device.

Figure 10:
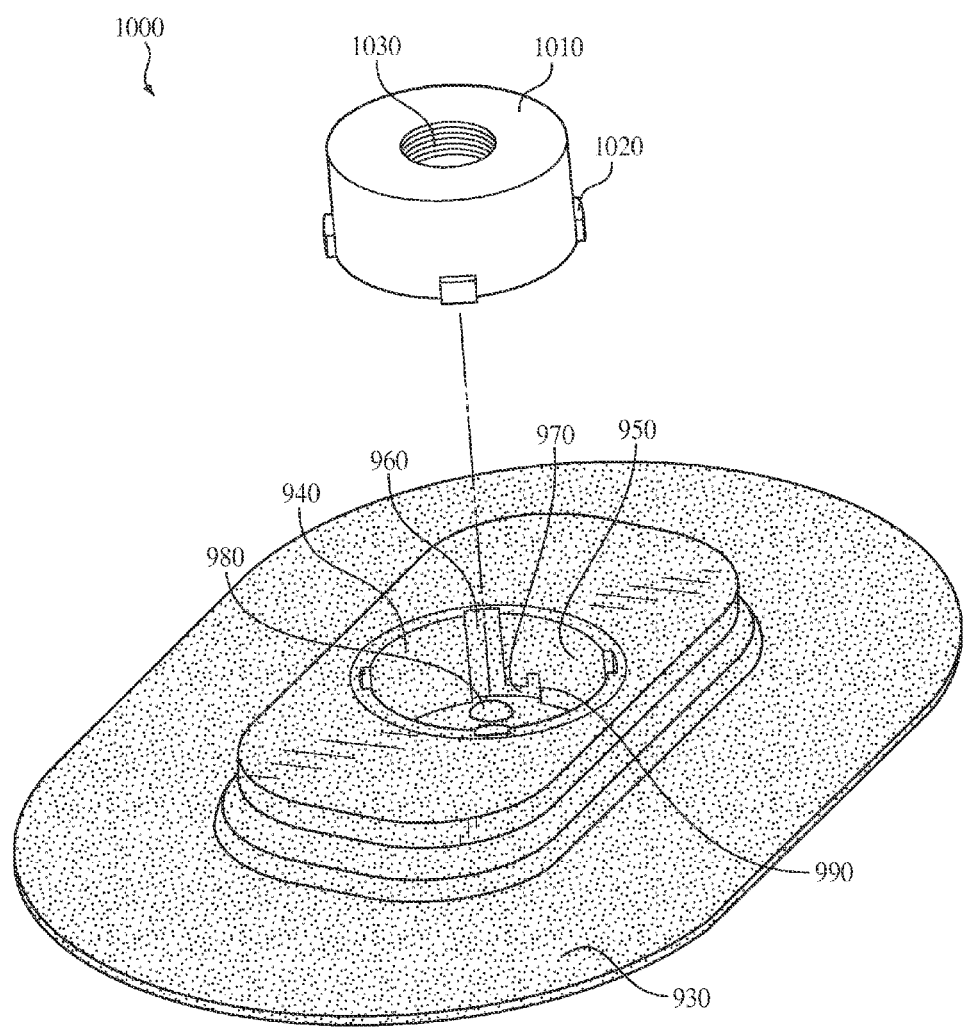
FIG. 10 is a partial exploded view of yet another alternative embodiment of a tire monitor assembly.

FIG. 10 is a partial exploded view of yet another alternative embodiment of a mounting assembly 1000. In this embodiment, the mounting apparatus 930 is the same as that described above with respect to FIG. 9. The mounting assembly 1000 further includes an insert 1010 having tabs 1020. The insert 1010 is received by the cavity 940 of the mounting apparatus 930 in the same manner described above with respect to FIG. 9. The insert 1010 further includes a cavity 1030 that is a threaded hole configured to receive a threaded member, such as the threaded fastener 820 of the tire monitoring device 810 shown in FIG. 8. By employing the insert 1010, the mounting apparatus 930 may be adapted to receive any of the tire monitoring devices described herein.

Figure 11:
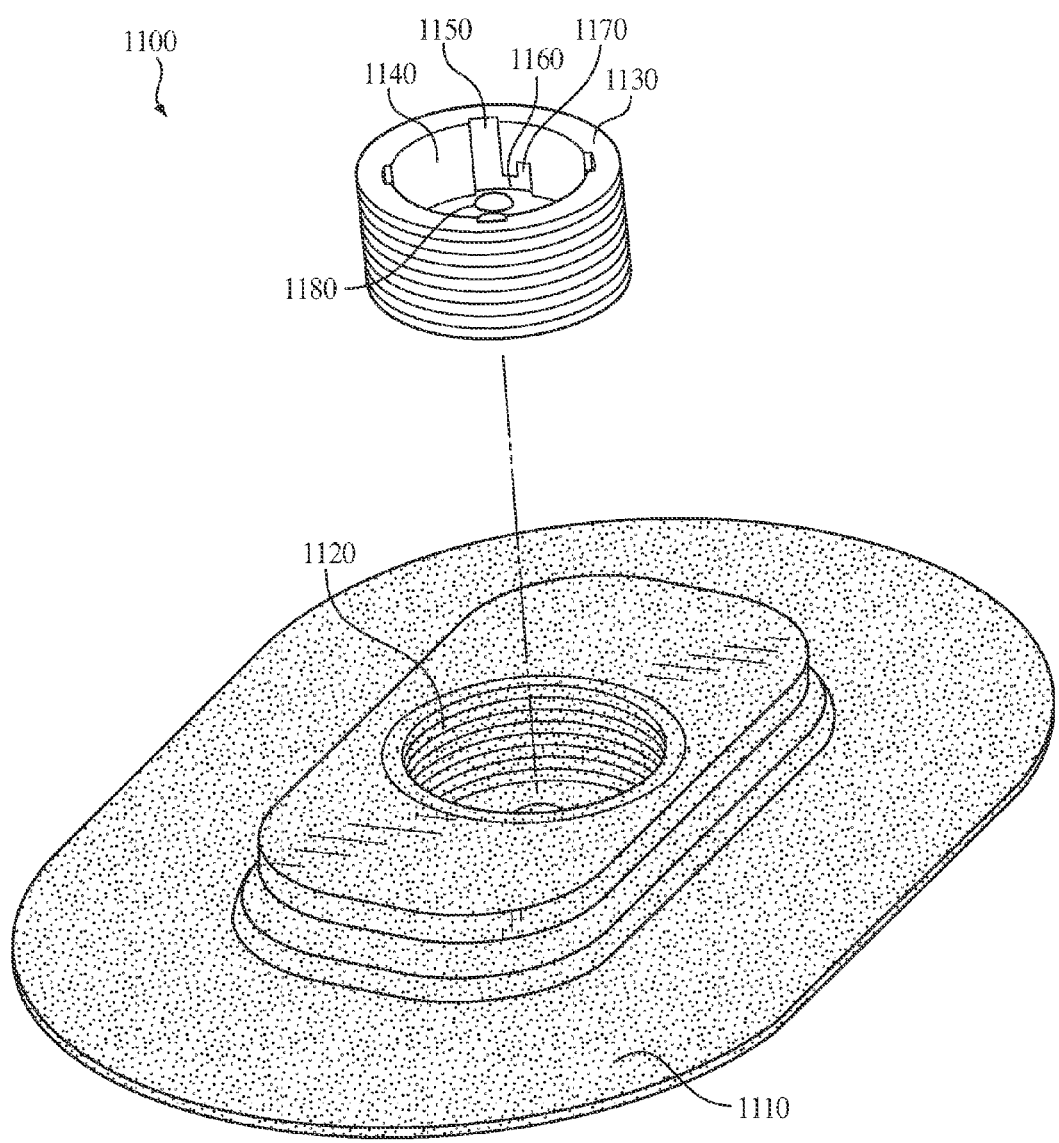
FIG. 11 is a partial exploded view of still another alternative embodiment of a tire monitor assembly.

FIG. 11 is a partial exploded view of still another alternative embodiment of a mounting assembly 1100. In this embodiment, the mounting assembly 1100 includes a mounting apparatus 1110 that is substantially the same as the mounting apparatus 100 described above with respect to FIGS. 1-8. However, the mounting apparatus 1110 includes a larger threaded cavity 1120 that is configured to receive a threaded insert 1130. The threaded insert 1130 includes a cavity 1140 having grooves 1150, 1160 and notch 970 that are substantially the same as the grooves 960, 970 and notch 990 of the cavity 940 described above with respect to FIG. 9. The cavity 1140 further includes a biasing member 1180 that is substantially the same as the biasing member 980 of the cavity 940 described above with respect to FIG. 9. The cavity 1140 is therefore configured to receive a bayonet-style tire monitoring device, such as the tire monitoring device 910 illustrated in FIG. 9. An additional insert (not shown) having a threaded cavity may be employed to receive threaded members, such as the threaded fastener 820 of the tire monitoring device 810 shown in FIG. 8A. By employing these inserts, the mounting apparatus 1110 may be adapted to receive any of the tire monitoring devices described herein.

Additionally, a solid plug (not shown) may be used fill in the cavity of the patch in instances where only clamps are used. Such a plug may be constructed of an elastomeric material, or metal. For example, in the embodiment illustrated in FIG. 5, a plug may be inserted into the cavity before the tire monitoring device 510 is clamped to the tire mounting apparatus 100.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire monitor assembly for monitoring tire information, the assembly comprising:
    a rubber ply having a first side affixable to an interior surface of a tire;
    a pedestal extending from a second side of the rubber ply, the pedestal having a top surface and at least one sidewall, wherein the pedestal has a groove disposed in the at least one sidewall, extending along a perimeter of the pedestal, and wherein the pedestal has a cavity disposed in the top surface, extending towards the rubber ply;
    a tire monitoring device; and
    a fastener connected to the tire monitoring device and further connected to the pedestal such that the fastener is disposed in at least one of the cavity and the groove.

2. The tire monitor assembly of claim 1, wherein the cavity has internal threads.

3. The tire monitor assembly of claim 2, wherein the fastener includes a threaded rod connected to the tire monitoring device, the threaded rod having threads corresponding to the internal threads of the cavity.

4. The tire monitor assembly of claim 2, wherein the fastener includes an insert having external threads corresponding to the internal threads of the cavity, the insert further having an aperture with sidewall structures configured to mate with corresponding structures connected to the tire monitoring device.

5. The tire monitor assembly of claim 4, wherein the sidewall structures of the aperture of the insert includes a plurality of grooves, and wherein the corresponding structures connected to the tire monitoring device includes a plurality of tabs.

6. The tire monitor assembly of claim 1, wherein the fastener is a fastener assembly including at least two clamps, each clamp having a portion dimensioned to be received by the groove.

7. The tire monitor assembly of claim 6, wherein each of the at least two clamps has a through hole, and the tire monitoring device has at least one corresponding through hole.

8. The tire monitor assembly of claim 7, wherein the fastener assembly further includes at least one pin that extends through the through holes of the at least two clamps and the at least one corresponding through hole of the tire monitoring device.

9. The tire monitor assembly of claim 1, wherein the fastener includes a member having at least one rib, and wherein the tire monitoring device includes at least one groove that slidably receives the at least one rib.

10. An apparatus for mounting an object within a tire, the apparatus comprising:
    a ply having a first side for mounting against an innerliner of the tire;
    a lower pedestal extending upwards from a second side of the ply;
    a neck extending upwards from the lower pedestal; and
    an upper pedestal extending upwards from the neck and defining a lip configured to receive a clamp, the upper pedestal having a planar top surface, with a substantially cylindrical cavity disposed therein, wherein the substantially cylindrical cavity is defined by an internal sidewall extending through the upper pedestal and at least partially through the neck, and wherein the internal sidewall includes mating structure selected from the group consisting of threads and a plurality of downwardly extending slots.

11. The apparatus of claim 10, wherein the object mounted within a tire is a tire monitoring device.

12. The apparatus of claim 10, wherein each of the lower pedestal, the neck, and the upper pedestal is substantially rectangular when viewed from above.

13. The apparatus of claim 12, wherein the lower pedestal has a first width and a first length, the neck has a second width and a second length, and the upper pedestal has a third width and a third length, the third width being greater than the second width and less than the first width, and the third length being greater than the second length and less than the first length.

14. The apparatus of claim 12, wherein the lower pedestal has a first height, the neck has a second height, and the upper pedestal has a third height, the third height being greater than the second height.

15. A tire monitoring kit comprising:
    a mounting apparatus having a plurality of mounting configurations;
    a tire monitoring device; and
    a means for connecting the tire monitoring device to the mounting apparatus using only one of the plurality of mounting configurations.

16. The tire monitoring kit of claim 15, wherein the mounting apparatus includes a pedestal having a top surface and at least one sidewall.

17. The tire monitoring kit of claim 16, wherein the plurality of mounting configurations includes a cavity disposed in the top surface of the pedestal.

18. The tire monitoring kit of claim 16, wherein the plurality of mounting configurations includes a groove disposed in the at least one sidewall.

19. The tire monitoring kit of claim 18, wherein the groove extends along an entire perimeter of the pedestal.

20. The tire monitoring kit of claim 15, wherein the mounting apparatus is a rubber patch that is configured to bond to an innerliner surface of a tire and a fastener for fastening a tire monitoring device to the rubber patch.

* * * * *